R. MILNE.
ROUTING MACHINE.
APPLICATION FILED NOV. 22, 1907.
901,722.
Patented Oct. 20, 1908.
2 SHEETS—SHEET 1.
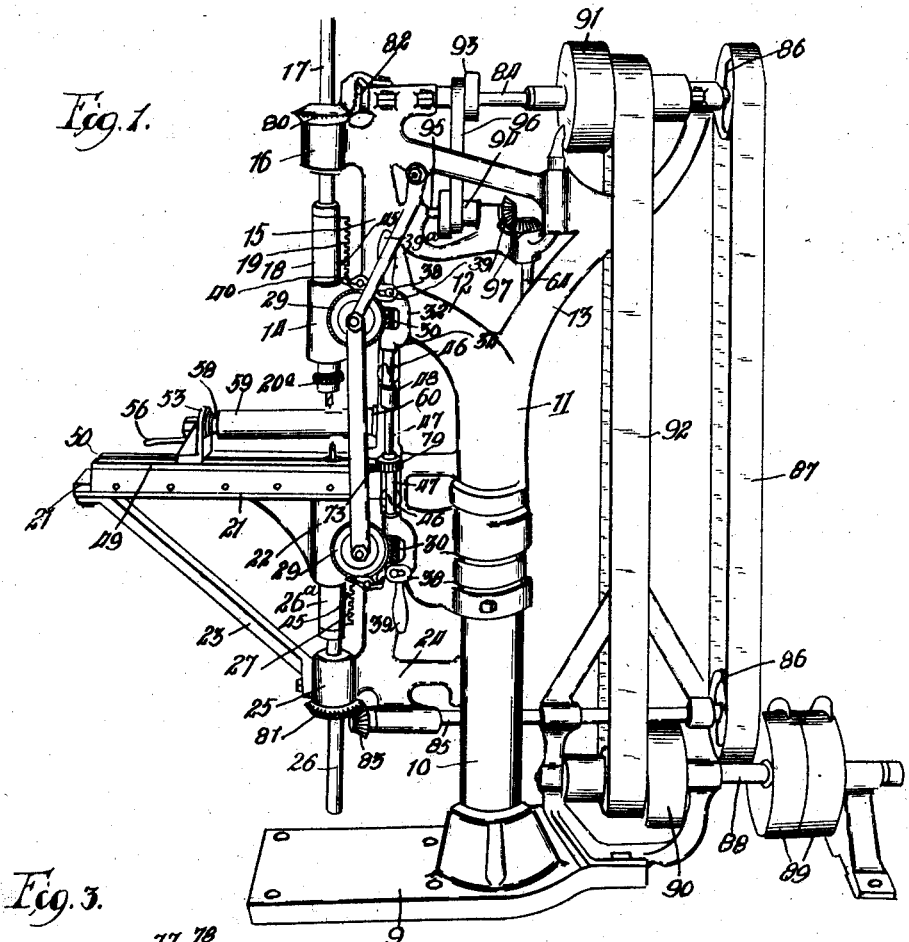
Fig. 1.
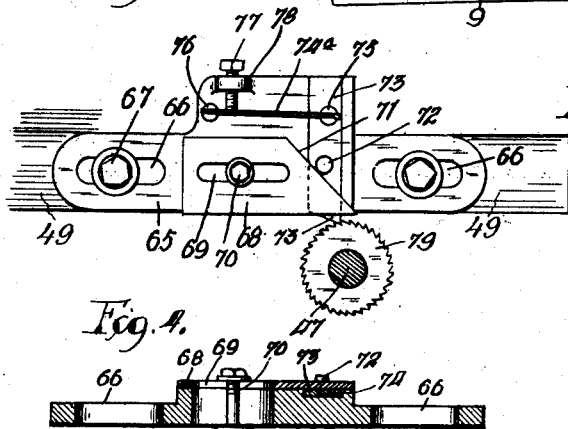
Fig. 3.
Fig. 4.
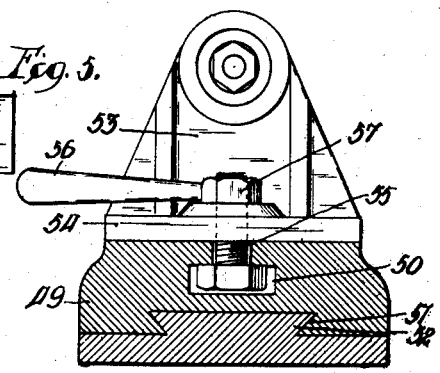
Fig. 5.
Witnesses:
Wm P. Bond
Pierson W. Banning.
Inventor:
Robert Milne
by Banning & Banning
Attys.

R. MILNE.
ROUTING MACHINE.
APPLICATION FILED NOV. 22, 1907.
901,722.
Patented Oct. 20, 1908.
2 SHEETS—SHEET 2.
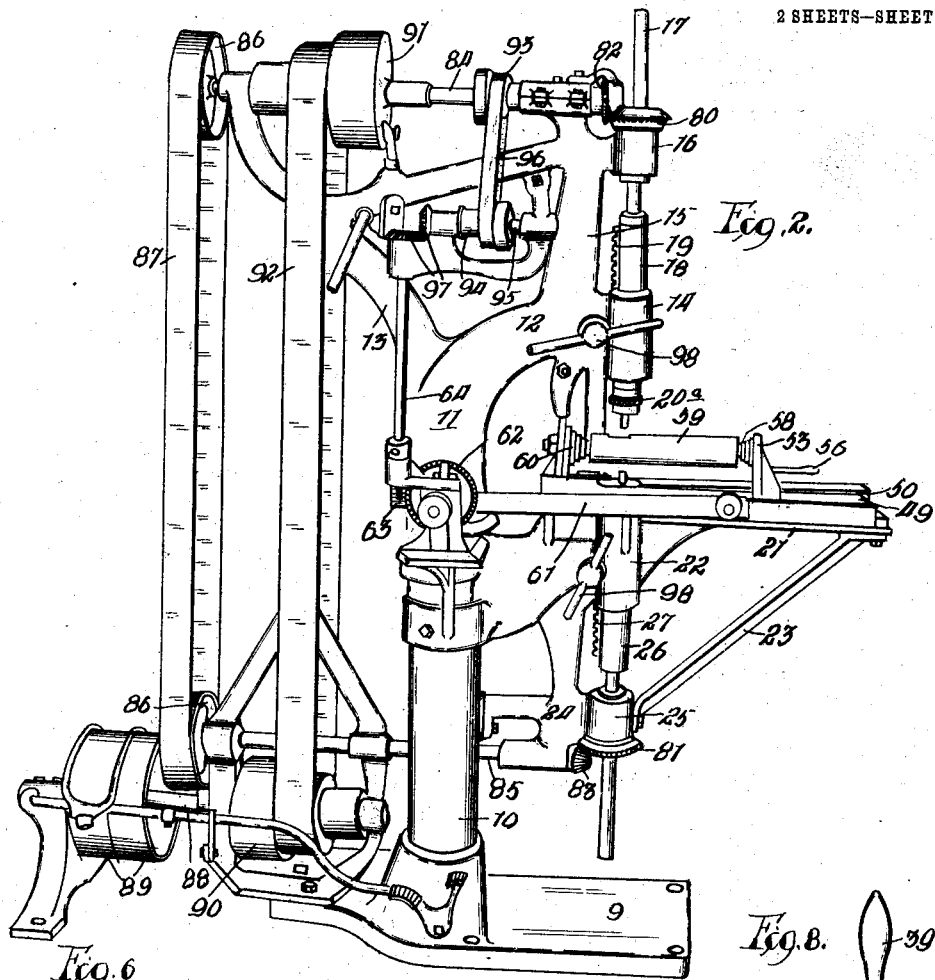

UNITED STATES PATENT OFFICE.

ROBERT MILNE, OF ROCKFORD, ILLINOIS, ASSIGNOR TO B. F. BARNES COMPANY, A CORPORATION OF ILLINOIS.

ROUTING-MACHINE.

No. 901,722.    Specification of Letters Patent.    Patented Oct. 20, 1908.

Application filed November 22, 1907. Serial No. 403,417.

*To all whom it may concern:*

Be it known that I, ROBERT MILNE, a citizen of the United States, residing at Rockford, in the county of Winnebago, in the State of Illinois, have invented certain new and useful Improvements in Routing-Machines, of which the following is a specification.

The machine of this invention is intended more especially for use in cutting out the drift slots in drill spindles, although the machine can be used for routing work generally.

The invention, moreover, relates to the means employed for reciprocating the work and intermittently feeding the cutting drills thereinto; to the means for automatically throwing the drill feeding mechanism out of mesh after the drills have cut inwardly to a predetermined point; to the ratchet mechanism for actuating the feed by the reciprocation of the work table and the machine as a whole and the individual parts thereof.

The machine, as shown and described, is intended to make a double cut from above and below the work, so that the essential portions of the operating mechanism are duplicated, although it is not intended to limit the invention strictly to such duplication of parts since a single drill spindle could be employed if desired.

The invention consists in the features of construction and combination of parts hereinafter described and claimed.

In the drawings Figure 1 is a perspective side view of the entire machine, showing one side thereof; Fig. 2 a similar view showing the reverse side; Fig. 3 a top or plan view of the ratchet feeding mechanism; Fig. 4 a longitudinal sectional view of the ratchet feeding mechanism; Fig. 5 a cross sectional view of the work table, showing the adjustable dog; Fig. 6 an enlarged detail of the worm feed in mesh; Fig. 7 a similar view showing the worm feed thrown out of mesh; and Fig. 8 an edge elevation of the swinging bracket for the worm gear.

The machine is mounted upon a bed plate 9 from which rises a main post 10 having mounted thereon a heavy Y bracket frame 11 comprising a forwardly extending arm 12 and a rearwardly extending arm 13. The forward arm is of curved formation and terminates in a drill spindle head 14 immediately behind which rises an upright 15 which carries a journal mounting 16 within which a drill spindle 17 is rotatably mounted. The drill spindle is rotatably mounted in and passes through a sleeve 18 slidably mounted within the spindle head 14 and has on its inner side a rack 19 which meshes with a pinion 20 shown in dotted lines in Fig. 7. This method of feeding is old and well understood and need not be described in detail. The drill spindle terminates at its lower end in a drill chuck 20ª which is located above a stationary feed table 21 supported upon a forwardly extending bracket 22 which is mounted upon the post 10. The bracket 22 is supplemented by a diagonally extending brace 23 which connects with a lower journal bracket 24 having thereon a journal head 25 through which the lower drill spindle 26 is entered. The lower drill spindle likewise passes through a sleeve 26ª slidably mounted within the bracket 22 and provided with a rack 27 similar in all respects to and fed in the same manner as the rack 19 of the upper sleeve. Aside from a slight difference in the formation of the framework of the machine, the portions thereof above and below the work table are duplicates one of the other, so that in describing the essential portions of the mechanism it will be understood that the same description applies to the parts above and below the feed table.

The feeding pinions for the racks 19 and 27 are mounted upon shafts 28 which pass through the framework immediately behind the upper and lower racks, and each has, on its outer end, a worm gear wheel 29 which meshes with a worm gear 30 carried by and rotatably mounted within a pivoted bracket 31. The pivoted bracket comprises a head 32 with which are connected outer and inner journal mountings 33 and 34 respectively, through the latter of which the stub end 35 of the worm gear passes. The inner journal head 34 has inwardly and backwardly extending therefrom a pivot arm 36 which is pivoted to a suitable portion of the framework of the machine. The upper bracket 31 is pivoted to a depending arm 37 which is connected with the forward arm 12 of the Y bracket frame. The lower worm gear bracket is connected with the adjacent portion of the forwardly extending bracket frame 22 immediately adjacent to the table 21. The particular formation of the framework of the machine and the method of attaching the bracket arms might be varied without materially changing the character of the machine.

Each of the pivoted worm brackets is provided, near its outer end, with a slotted head 38 which receives a pin 39 adapted to limit the retraction of the worm bracket, which latter is provided with a handle 39ª for facilitating its manipulation.

When the worm bracket is thrown forward the worm will be brought into mesh with the worm gear 29, as shown in Fig. 6. The parts are held in mesh by the action of a dog 40 pivoted immediately forward of the slotted bracket head 38. The dog is provided, at its inner end, with an inwardly extending tooth 41 which is adapted to engage with an outwardly extending tooth 42 on the bracket head, the inner side 43 of which latter tooth is beveled or sloped to provide a cam surface. The dog is provided with a spring 44 which encircles the pivot, the outer end being connected with the dog and the inner end engaging the cam face 43 of the tooth 42. The spring so mounted serves to exert a tension tending to throw up the forward end of the dog 41 and to throw back the bracket head by the contact of the inner end of the spring with the cam surface. This tendency of the spring will be counteracted so long as the teeth 41 and 42 are in engagement, but will serve to throw back the pivoted worm bracket head as soon as the tooth on the dog is thrown out of engagement with the tooth on the bracket head. The racks 19 and 27 are each provided with a laterally extending stop pin 45 which is adapted to engage the outer end of the dog when the rack has been fed a predetermined distance, thereby moving the dog to the position shown in Fig. 7, which releases the worm bracket and permits the spring 44 to throw the worm out of engagement with the worm gear wheel.

The stub ends of the upper and lower worm gear shafts are connected by means of double balls joints 46 with a main center feed shaft 47 mounted at its upper end in a journal bearing 48 which is carried by the depending arm 37 to which the upper worm bracket is pivoted, as best shown in Fig. 8.

The stationary table 21 has mounted thereon a slide plate 49 provided in its center with on inverted T slot 50 as shown in Fig. 5. The slide plate has in its under face a dovetail channel 51 which coöperates with a dovetail rib 52 in the center of the table 21 which holds the slide plate in exact alinement during its travel. The T slot 50 serves as a mounting for a chuck frame 53 having a bed plate 54 through which is entered a bolt 55 the head of which is adapted to engage the overhanging edges of the T slot 50. The bolt is adapted to be tightened by a handle 56 provided with a head 57 which engages the upper end of the bolt. The chuck frame has, on its inner face, a chuck 58 which bears against the outer end of the work 59 which, as shown, is in the form of a tubular drill spindle in which drift slots are being routed. The inner end of the work is engaged by an inner chuck 60, the inner and outer chucks serving to hold the work rigid during the action of the drills.

A reciprocation is imparted to the slide plate by the action of a pitman 61 which is pivoted at its outer end to the side of the slide plate, and is eccentrically pivoted at its inner end to the inner face of a gear wheel 62 which engages with a worm 63 on the lower end of a vertical shaft 64.

The slide plate has mounted thereon, at its inner front corner, a plate 65 provided in its ends with slots 66, through which are entered bolts 67 connecting the slotted plate 65 with the slide plate and permitting its adjustment with respect thereto. The slide plate has mounted thereon an adjustable cam plate 68 provided with a slot 69 which receives a bolt 70, permitting the cam plate to be moved in or out as may be desired. The cam plate is provided on its inner end with a beveled or cam edge 71 which is adapted to bear against a stop pin 72 which upwardly extends from a dog 73 slidably mounted in a groove 74 in the plate 65 immediately beneath the beveled end of the adjustable cam plate under which the end of the dog lies. The dog is held in projected position by means of a flat spring 74 which enters a stud 75 on the rear end of the dog, being rigidly secured at its opposite end within a stud 76 on the plate 65. The tension of the spring can be adjusted by means of a set screw 77 entered through a lug 78 as shown in Fig. 3. The outwardly projecting end of the dog is beveled, as shown, and is adapted to engage with the teeth of a ratchet wheel 79 mounted upon the vertical connecting shaft 47, which mechanism serves to give a partial revolution to the shaft on each forward movement of the slide plate, permitting the dog to slide over the ratchet teeth on the return movement. The number of teeth which will be engaged by the dog can be varied by adjusting the projection of the dog, which adjustment is effected by shifting the position of the slidable cam plate 69.

The upper and lower drill spindles are provided with bevel pinions 80 and 81 respectively, which bevel pinions mesh with bevel pinions 82 and 83 respectively mounted upon upper and lower shafts 84 and 85 respectively. The upper and lower shafts are each provided with a pulley 86, which pulleys have passed thereover a belt 87. Power is imparted to a main power shaft 88 having thereon fast and loose pulleys 89 and also having thereon a cone pulley 90, which coöperates with a cone pulley 91 on the shaft 84, rotation being imparted to said shaft by a belt 92. The shaft 84 is further provided with a small cone pulley 93 which coöperates with a small cone 94 on a stub shaft 95, a belt 96 serving to impart rotation from one shaft to the other. The stub shaft 95 serves to impart rotation to the vertical shaft 64 through the medium of intermeshing bevel pinions 97 on the stub and vertical shafts respectively.

The upper and lower shafts 28 which serve to feed the spindle sleeves down are each provided at the rear end with a handle 98 which handles permit the sleeves to be thrown back to initial position after the drills have been fed inwardly to the limit of their movement.

In use, the work is positioned between the chucks on the sliding plate, and the pitman 61 adjusted to give the proper throw with every revolution of the wheel 62, which throw should be sufficient to give the required length to the cut in the work. The drill spindles can be either automatically fed to cutting position by the action of the worm feeds, or can be moved into position by the handles 98 after the worm gear has been thrown out of mesh. The latter mode of adjustment is ordinarily more rapid. With the drills in proper position, equal rotation is imparted thereto through the line of shafting, and the work will proceed automatically. With each inward movement of the slide plate the ratchet wheel 79 will be moved a predetermined distance, depending upon the projection of the dog and the number of ratchet teeth skipped over on each reciprocation. With each complete reciprocation of the slide plate the drills will be fed inward a predetermined distance and will thus continue to approach each other until the drift slots have been completely cut through, at which point the upper and lower racks will have moved sufficiently to bring the respective stop pins 45 into contact with the ends of the upper and lower dogs which will be moved inwardly by any continued movement of the racks, thereby disengaging the dog teeth from the teeth on the upper and lower pivoted worm brackets, which disengagement allows the springs 40 to act and throw back the pivoted worm brackets sufficiently to disengage the worm gearing. The double ball joints being exactly in front of the axes of the worm brackets permit a swinging movement of the latter without binding or cramping, so that the tension of the springs on the cam faces 42 will be amply sufficient to move the worm brackets the required distance.

It will thus be seen from the foregoing description that the speed of feeding will be in a predetermined ratio to the travel of the work and that the movement of the approaching drills will be automatically stopped before they have come into contact with one another, thereby preventing injury or destruction of the drills.

Although the feed mechanism has been described in duplicate, it is obvious that a single feeding train and drill spindle could be used by throwing the other feeding train out of mesh, and in like manner the machine could be applied with but a single drill spindle and feed if companion spindles were not required.

What I claim as new and desire to secure by Letters Patent is:

1. In a machine of the class described, the combination of a slide plate, means for reciprocating the slide plate, a dog carried by the slide plate, a ratchet wheel adapted to be engaged by the dog, a worm connected with and adapted to be actuated by the ratchet wheel, a worm gear normally in mesh with the worm, and a drill member adapted to be intermittently advanced by the movement of the worm gear wheel, substantially as described.

2. In a machine of the class described, the combination of a slide plate, means for reciprocating the slide plate, a dog carried by the slide plate, a ratchet wheel adapted to be engaged by the dog, a worm connected with and adapted to be actuated by the ratchet wheel, a worm gear normally in mesh with the worm, a drill member adapted to be intermittently advanced by the movement of the worm gear wheel, a pivoted bracket within which the worm is journaled, and means for automatically throwing back the pivoted bracket at a predetermined point in the advance of the drill member to unmesh the worm and worm gear, substantially as described.

3. In a machine of the class described, the combination of a slide plate, means for reciprocating the slide plate, a dog carried by the slide plate, a ratchet wheel adapted to be engaged by the dog, a worm connected with and adapted to be actuated by the ratchet wheel, a worm gear normally in mesh with the worm, a drill member adapted to be intermittently advanced by the movement of the worm gear wheel, a pivoted bracket within which the worm is journaled, a dog normally engaging the bracket to hold the worm and worm gear in mesh, means for throwing back the bracket on the release of the dog, and a member movable with the drill member and adapted to engage the dog at a predetermined point and move it to releasing position, substantially as described.

4. In a machine of the class described, the combination of a slide plate, means for reciprocating the slide plate, a feed shaft, a worm jointed to the feed shaft, a pivoted bracket within which the worm is journaled, means for imparting rotation to the feed shaft, a worm gear normally meshing with the worm, a drill member adapted to be advanced by the movement of the worm gear, and means for automatically throwing back the pivoted worm bracket at a predetermined point in the advance of the drill member, substantially as described.

5. In a machine of the class described, the combination of a slide plate, means for reciprocating the slide plate, a feed shaft, a worm journaled to the feed shaft, a pivoted bracket within which the worm is journaled, means for imparting rotation to the feed shaft, a worm gear normally meshing with the worm, a drill member adapted to be advanced by the movement of the worm gear, a dog normally engaging the worm bracket, a spring adapted to throw back the bracket when released by the dog, and means movable with the drill member for actuating the dog at a predetermined point to release the bracket, substantially as described.

6. In a machine of the class described, the combination of a slide plate, means for reciprocating the slide plate, a dog carried by the slide plate, a ratchet wheel adapted to be engaged by the dog, a feed shaft upon which the ratchet wheel is mounted, a worm jointed to the feed shaft, a movable bracket within which the worm is journaled, a worm gear normally in engagement with the worm, a drill member adapted to be advanced by the rotation of the worm gear, and means actuated by the advance of the drill member for moving the worm bracket at a predetermined point to throw the worm and worm gear out of mesh, substantially as described.

7. In a machine of the class described, the combination of a drill member, a worm meshing with the worm gear, a pivoted bracket within which the worm gear is journaled, a feed shaft jointed to the worm, means for moving the pivoted bracket at a predetermined point in the advance of the drill member to throw the worm and worm gear out of mesh, and means for rotating the feed shaft, substantially as described.

8. In a machine of the class described, the combination of a drill member, a worm meshing with the worm gear, a pivoted bracket within which the worm gear is journaled, a feed shaft jointed to the worm, means for moving the pivoted bracket at a predetermined point in the advance of the drill member to throw the worm and worm gear out of mesh, and means for rotating the feed shaft at a speed proportionate to the advance of the drill member, substantially as described.

9. In a machine of the class described, the combination of a drilling tool, a worm gear adapted to advance the drilling tool, a worm normally meshing with the worm gear, a pivoted bracket within which the worm is journaled, a dog normally engaging the bracket, a spring on the dog adapted to throw back the bracket when the latter is released by the dog, means for moving the dog to releasing position at a predetermined point in the advance of the drilling tool, and a feed shaft to which the worm is jointed, substantially as described.

10. In a machine of the class described, the combination of a drilling tool, a worm gear adapted to advance the drilling tool, a worm normally meshing with the worm gear, a pivoted bracket within which the worm is journaled, a dog normally engaging the bracket, a spring on the dog adapted to throw back the bracket when the latter is released by the dog, means for moving the dog to releasing position at a predetermined point in the advance of the drilling tool, a feed shaft to which the worm is jointed, and means for rotating the feed shaft at a speed proportionate to the advance of the drilling tool, substantially as described.

11. In a machine of the class described, the combination of a drilling tool, a worm gear adapted to advance the drilling tool, a worm normally meshing with the worm gear, a pivoted bracket within which the worm is journaled, a dog normally engaging the bracket, a spring on the dog adapted to throw back the bracket when the latter is released by the dog, means for moving the dog to releasing position at a predetermined point in the advance of the drilling tool, a feed shaft to which the worm is jointed, and means for intermittently rotating the feed shaft at a ratio proportionate to the advance of the drilling tool, substantially as described.

12. In a machine of the class described, the combination of a slide plate, upper and lower drilling tools coöperating with the slide plate and adapted to act on the work from opposite sides, means for reciprocating the slide plate, upper and lower worm gears adapted to advance the respective drilling tools in unison with one another, upper and lower worms normally meshing with the worm gears, upper and lower pivoted brackets within which the respective worms are journaled, a feed shaft jointed at its ends to the upper and lower worms, a ratchet wheel on the feed shaft, and a dog on the slide plate engaging said ratchet wheel and adapted to move the feed shaft in conformity with the reciprocation of the slide plate, substantially as described.

13. In a machine of the class described, the combination of a slide plate, upper and lower drilling tools coöperating with the slide plate and adapted to act on the work from opposite sides, means for reciprocating the slide plate, upper and lower worm gears adapted to advance the respective drilling tools in unison with one another, upper and lower worms normally meshing with the worm gears, upper and lower pivoted brackets within which the respective worms are journaled, a feed shaft jointed at its ends to the upper and lower worms, a ratchet wheel on the feed shaft, a dog slidably mounted on the slide plate and adapted to engage the teeth of the ratchet wheel, a stud on the dog, a cam plate engaging said stud and adapted, when moved, to vary the projection of the dog, and a spring for holding the dog in projected position, substantially as described.

14. In a machine of the class described, the combination of a drill member, a movable bracket, a train of gears adapted to actuate the drill member, one of the train being mounted within the movable bracket, means for holding the gear members so mounted in mesh with the next gear of the train, and means actuated by the advance of the drill member for moving the bracket at a predetermined point to throw the gear members out of mesh, substantially as described.

ROBERT MILNE.

Witnesses:
 SAML. H. RECK,
 W. B. BOWIE.